(12) United States Patent
Park (10) Patent No.: US 8,499,360 B2
(45) Date of Patent: Jul. 30, 2013

(54) ATOMIC FORCE MICROSCOPES AND METHODS OF MEASURING SPECIMENS USING THE SAME

(75) Inventor: Yonmook Park, Suwon-si (KR)

(73) Assignee: Samsung Electronics Co., Ltd, Gyeonggi-do (KR)

( * ) Notice: Subject to any disclaimer, the term of this patent is extended or adjusted under 35 U.S.C. 154(b) by 344 days.

(21) Appl. No.: 12/929,674

(22) Filed: Feb. 8, 2011

(65) Prior Publication Data

US 2011/0203020 A1     Aug. 18, 2011

(30) Foreign Application Priority Data

Feb. 17, 2010 (KR) .......................... 10-2010-014020

(51) Int. Cl.
*G01Q 10/04* (2010.01)
(52) U.S. Cl.
USPC ....................................... 850/3; 850/1; 850/2
(58) Field of Classification Search
USPC .......................................................... 850/1–3
See application file for complete search history.

(56) References Cited

U.S. PATENT DOCUMENTS 6,267,005 B1 *   7/2001   Samsavar et al. ............... 73/105

* cited by examiner

*Primary Examiner* — Michael Maskell
(74) *Attorney, Agent, or Firm* — Harness, Dickey & Pierce, P.L.C.

(57) ABSTRACT

Atomic force microscopes and methods of measuring specimens using the same. An atomic force microscope may precisely measure a 3D shape of a specimen using both a short-stroke scanner and a long-stroke scanner. The atomic force microscope may include a stage to transfer a specimen, at least one cantilever which includes a probe such that a driving displacement and a driving frequency are changed by attractive force and repulsive force in relation to atoms of the specimen, at least one short-stroke scanner which includes the cantilever so as to perform short-stroke scanning of the specimen, at least one long-stroke scanner which includes the short-stroke scanner so as to perform long-stroke scanning of the specimen, and at least one coarse approach system for transferring the short-stroke scanner and the long-stroke scanner to the specimen.

20 Claims, 4 Drawing Sheets

FIG. 4

ATOMIC FORCE MICROSCOPES AND METHODS OF MEASURING SPECIMENS USING THE SAME

CROSS-REFERENCE TO RELATED APPLICATION

This application claims priority under 35 U.S.C. §119 to Korean Patent Application No. 10-2010-0014020, filed on Feb. 17, 2010 in the Korean Intellectual Property Office (KIPO), the entire contents of which is incorporated herein by reference.

BACKGROUND

1. Field

Example embodiments relate to atomic force microscopes (AFM) that may serve as scanning probe microscopes using atomic force to precisely measure a three-dimensional (3D) shape of a specimen.

2. Description of the Related Art

An atomic force microscope (AFM) scans a cantilever including a fine probe over the surface of a specimen and detects displacement of the cantilever by atomic force applied between the probe and the specimen, such that it may measure a fine structure of the specimen surface. The atomic force microscope mounts a cantilever to any one of a flexure scanner based on a flexure mechanism and a piezoelectric tube scanner formed of a piezoelectric material, and scans a specimen.

A flexure scanner is driven by a piezoelectric motor, has a low coupling level between drivers, and is appropriate for long-stroke, high-speed, high-precision driving. However, it is difficult for the flexure scanner to implement the bending motion in which an X-axis driver and a Y-axis driver are respectively bent in the X-axis direction and the Y-axis direction. Therefore, the flexure scanner includes a cantilever and a probe, and has difficulty in precisely scanning a specimen having a complicated structure through a short-stroke at high speed.

The piezoelectric tube scanner is driven by a tube-shaped piezoelectric motor, has a high coupling level between drivers, and is appropriate for a short-stroke high-speed precise driving. In addition, the piezoelectric tube scanner can easily implement the bending motion in which an X-axis driver and a Y-axis driver are respectively bent in the X-axis direction and the Y-axis direction. Therefore, the piezoelectric tube scanner includes a cantilever and a probe, and has difficulty in precisely scanning a specimen having a simple structure through a long-stroke at high speed.

SUMMARY

According to example embodiments an atomic force microscope may be capable of precisely measuring a three-dimensional shape of a specimen using both a short-stroke scanner and a long-stroke scanner. Methods of measuring the specimen using the atomic force microscope may be provided.

According to example embodiments, an atomic force microscope includes a stage to transfer a specimen, at least one cantilever which includes a probe such that a driving displacement and a driving frequency are changed by attractive force and repulsive force in relation to atoms of the specimen, at least one short-stroke scanner which includes the cantilever so as to perform short-stroke scanning of the specimen, at least one long-stroke scanner which includes the short-stroke scanner so as to perform long-stroke scanning of the specimen, and at least one coarse approach system for transferring the short-stroke scanner and the long-stroke scanner to the specimen.

The short-stroke scanner may include a piezoelectric tube scanner formed of a piezoelectric material. The long-stroke scanner may include a flexure scanner using a flexure. The flexure scanner may include a flexure scanner driver driven in X-axis and Y-axis directions. The flexure scanner driver may include the short-stroke scanner comprised of a piezoelectric tube scanner in a Z-axis direction, wherein the piezoelectric tube scanner performs bending motion in which the piezoelectric tube scanner is bent in X-axis and Y-axis directions, and performs linear motion in which the piezoelectric tube scanner moves in a Z-axis direction.

The flexure scanner driver may include a light source for emitting a beam to measure a driving displacement of the cantilever, and a photo-detector for measuring the beam reflected from a surface of the cantilever. The atomic force microscope may further include an optical system for confirming that the beam arrives at the surface of the cantilever, and an objective lens for converting the beam emitted from the light source into a condensed beam, illuminating the surface of the cantilever with the condensed beam, and transmitting the beam reflected from the surface of the cantilever to the photo-detector. The light source may include a light-source positioning unit for positioning the light source, and the photo-detector may include a photo-detector positioning unit for positioning the photo-detector.

The atomic force microscope may further include a light source installed at an exterior of the long-stroke scanner so as to generate a beam used for measuring driving displacement of the cantilever, and fiber optics for transferring the beam emitted from the light source. The atomic force microscope may further include a collimator lens for converting the beam generated from the fiber optics into a parallel beam or a condensed beam such that the output beam of the fiber optics does not spread out across a wide area, and a fiber-optics positioning unit for positioning the fiber optics. The atomic force microscope may further include a flexure scanner position measurement unit for measuring a variation of X-axis and Y-axis positions of the flexure scanner driver.

The atomic force microscope may further include a piezoelectric tube scanner position measurement unit for measuring X-axis, Y-axis and Z-axis positions of the piezoelectric tube scanner, and a piezoelectric tube scanner attachment mounted to the piezoelectric tube scanner such that a signal generated from a signal generator of the piezoelectric tube scanner position measurement unit is reflected onto a signal detector of the piezoelectric tube scanner position measurement unit. The light source may include a laser diode for generating a laser beam. The atomic force microscope may further include a specimen fixing module for fixing the specimen to the stage, and a vibration isolation table for controlling vibration of the stage.

The atomic force microscope may further include at least one oscillation piezoelectric motor for vibrating the cantilever at high speed. The atomic force microscope may further include at least one lock-in amplifier for measuring at least one of a driving displacement, a vibration displacement, and a vibration phase of the cantilever. The atomic force microscope may further include an image processing module for imaging a three dimensional shape and a phase of the specimen, and a display module for displaying an output signal of the image processing module. The piezoelectric tube scanner may be mounted to the flexure scanner driver in such a manner that a center of mass of the piezoelectric tube scanner is identical to that of the flexure scanner. The cantilever may include a Z-axis driver so as to drive the cantilever in a Z-axis direction, and include a Z-axis displacement measurement sensor so as to measure a Z-axis displacement of the cantilever.

According to other example embodiments, an atomic force microscope includes a stage to transfer a specimen, at least one cantilever which includes a probe such that a driving displacement and a driving frequency are changed by attractive force and repulsive force in relation to atoms of the specimen, at least one piezoelectric tube scanner which includes the cantilever so as to perform short-stroke scanning of the specimen in X-axis, Y-axis, and Z-axis directions, and at least one flexure scanner which includes the piezoelectric tube scanner in a Z-axis direction so as to perform long-stroke scanning of the specimen in X-axis and Y-axis directions.

According to yet other example embodiments, a method for measuring a specimen includes fixing a specimen to a stage, fixing a cantilever to a cantilever fixing module, simultaneously moving a flexure scanner and a piezoelectric tube scanner toward the specimen by measuring driving displacement of the cantilever and at the same time driving a coarse approach system, moving the cantilever toward the specimen by driving the piezoelectric tube scanner, constantly controlling the driving displacement of the cantilever under a condition that a probe contacts the specimen, and measuring a variation of the driving displacement of the cantilever, driving the flexure scanner in X-axis and Y-axis directions, driving the piezoelectric tube scanner in X-axis, Y-axis and Z-axis directions, and scanning the specimen using the probe, measuring the driving displacement of the cantilever using a lock-in amplifier, allowing an image processing module to receive an output signal of the lock-in amplifier so as to perform imaging of a 3D shape of the specimen, and allowing a display module to display a 3D shape of the specimen upon receiving an output signal of the image processing module.

According to further example embodiments, a method for measuring a specimen includes fixing a specimen to a stage, fixing a cantilever to a cantilever fixing module, simultaneously moving a flexure scanner and a piezoelectric tube scanner toward the specimen by measuring driving displacement of the cantilever and at the same time driving a coarse approach system, vibrating the cantilever at a constant vibration displacement and a constant vibration frequency, constantly controlling vibration displacement of the cantilever under a condition that a probe taps the specimen, thus measuring a variation of the vibration displacement of the cantilever, or constantly controlling vibration displacement or vibration frequency of the cantilever under a condition that a probe does not contact the specimen, thus measuring a vibration displacement variation, a vibration frequency variation or a vibration phase variation of the cantilever, long-stroke driving the flexure scanner in X-axis and Y-axis directions, and short-stroke driving the piezoelectric tube scanner in X-axis, Y-axis and Z-axis directions, thus scanning the specimen using the probe, measuring the driving displacement of the cantilever using a lock-in amplifier, allowing an image processing module to receive an output signal of the lock-in amplifier so as to perform imaging of a 3D shape of the specimen, and allowing a display module to display a 3D shape of the specimen upon receiving an output signal of the image processing module.

According to still further example embodiments, an atomic force microscope includes a stage configured to transfer a specimen, at least one cantilever including a probe, the cantilever configured such that at least one of a driving displacement and a driving frequency of the cantilever are based on forces between the cantilever and the specimen, at least one short-stroke scanner configured to perform short-stroke scanning of the specimen, the cantilever connected to the short-stroke scanner, at least one long-stroke scanner configured to perform long-stroke scanning of the specimen, the short-stroke scanner connected to the long-stroke scanner and at least one coarse approach system configured to transfer the short-stroke scanner and the long-stroke scanner to the specimen.

According to yet further example embodiments, an atomic force microscope includes a stage configured to transfer a specimen, at least one cantilever including a probe, the cantilever configured such that at least one of a driving displacement and a driving frequency of the cantilever are based on forces between the cantilever and the specimen, at least one piezoelectric tube scanner configured to perform short-stroke scanning of the specimen in X-axis, Y-axis, and Z-axis directions, the cantilever connected to the piezoelectric tube scanner and at least one flexure scanner configured to perform long-stroke scanning of the specimen in X-axis and Y-axis directions, the piezoelectric tube scanner connected to the flexure scanner in a Z-axis direction.

According to still yet further example embodiments, a method of measuring a specimen includes fixing a specimen to a stage, fixing a cantilever to a cantilever fixing module, simultaneously moving a flexure scanner and a piezoelectric tube scanner towards the specimen by measuring driving displacement of the cantilever and driving a coarse approach system, moving the cantilever toward the specimen by driving the piezoelectric tube scanner, controlling the driving displacement of the cantilever under a condition that a probe contacts the specimen, measuring a variation of the driving displacement of the cantilever, driving the flexure scanner in X-axis and Y-axis directions, driving the piezoelectric tube scanner in X-axis, Y-axis and Z-axis directions, and scanning the specimen using the probe, measuring, by a lock-in amplifier, the driving displacement of the cantilever, receiving, at an image processing module, an output signal of the lock-in amplifier so as to perform imaging of a 3D shape of the specimen and displaying, by a display module, the 3D shape of the specimen upon receiving an output signal of the image processing module.

According to still yet other example embodiments, a method of measuring a specimen includes fixing a specimen to a stage, fixing a cantilever to a cantilever fixing module, simultaneously moving a flexure scanner and a piezoelectric tube scanner towards the specimen by measuring driving displacement of the cantilever and driving a coarse approach system, vibrating the cantilever at about a constant vibration displacement and about a constant vibration frequency, one of measuring a variation of the vibration displacement of the cantilever by controlling vibration displacement of the cantilever under a condition that a probe taps the specimen and measuring at least one of a vibration displacement variation, a vibration frequency variation and a vibration phase variation of the cantilever by controlling one of vibration displacement and vibration frequency of the cantilever under a condition that a probe does not contact the specimen, scanning the specimen using the probe by long-stroke driving the flexure scanner in X-axis and Y-axis directions, and short-stroke driving the piezoelectric tube scanner in X-axis, Y-axis and Z-axis directions, measuring, by a lock in amplifier, the driving displacement of the cantilever, receiving, by an image processing module, an output signal of the lock-in amplifier so as to perform imaging of a 3D shape of the specimen and displaying, by a display module, a 3D shape of the specimen upon receiving an output signal of the image processing module.

BRIEF DESCRIPTION OF THE DRAWINGS

Example embodiments will be more clearly understood from the following brief description taken in conjunction with the accompanying drawings. FIGS. 1-4 represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments will now be described more fully with reference to the accompanying drawings, in which example embodiments are shown. Example embodiments may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1:
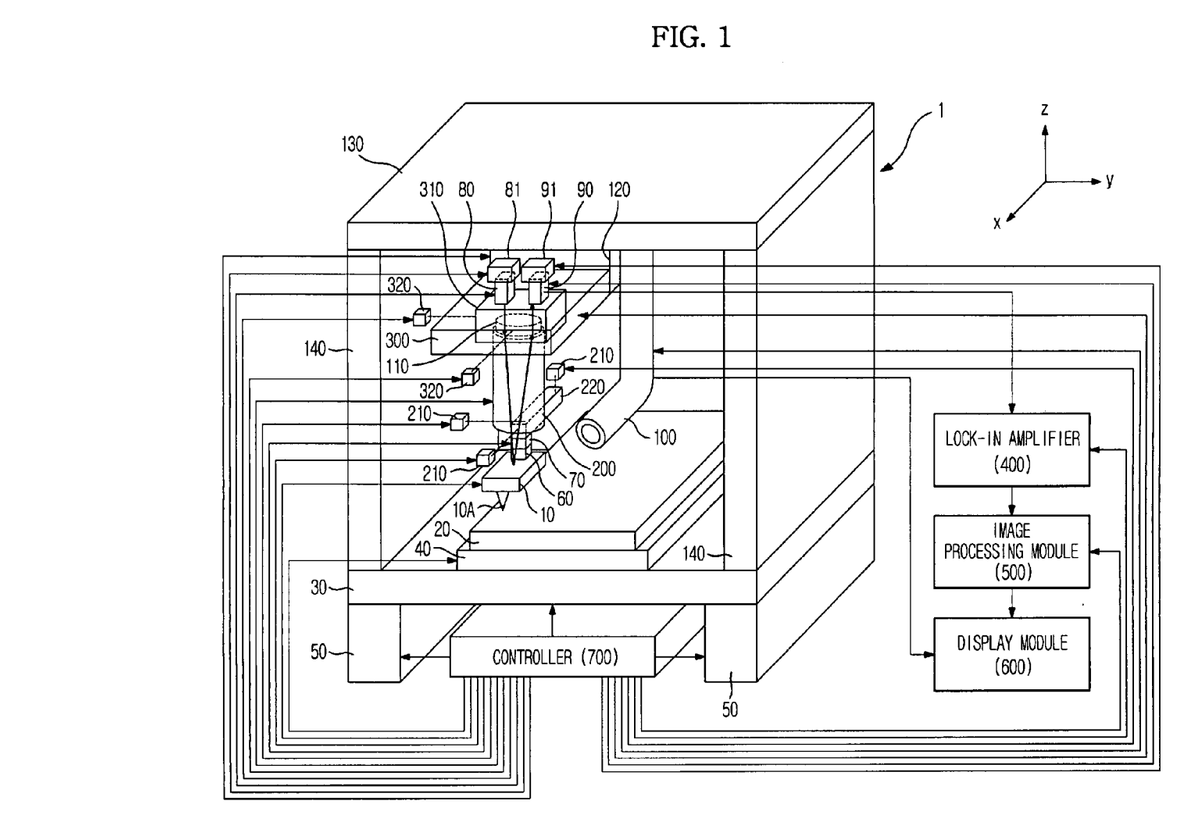
FIG. 1 is a diagram illustrating an atomic force microscope according to example embodiments.
Figure 2:
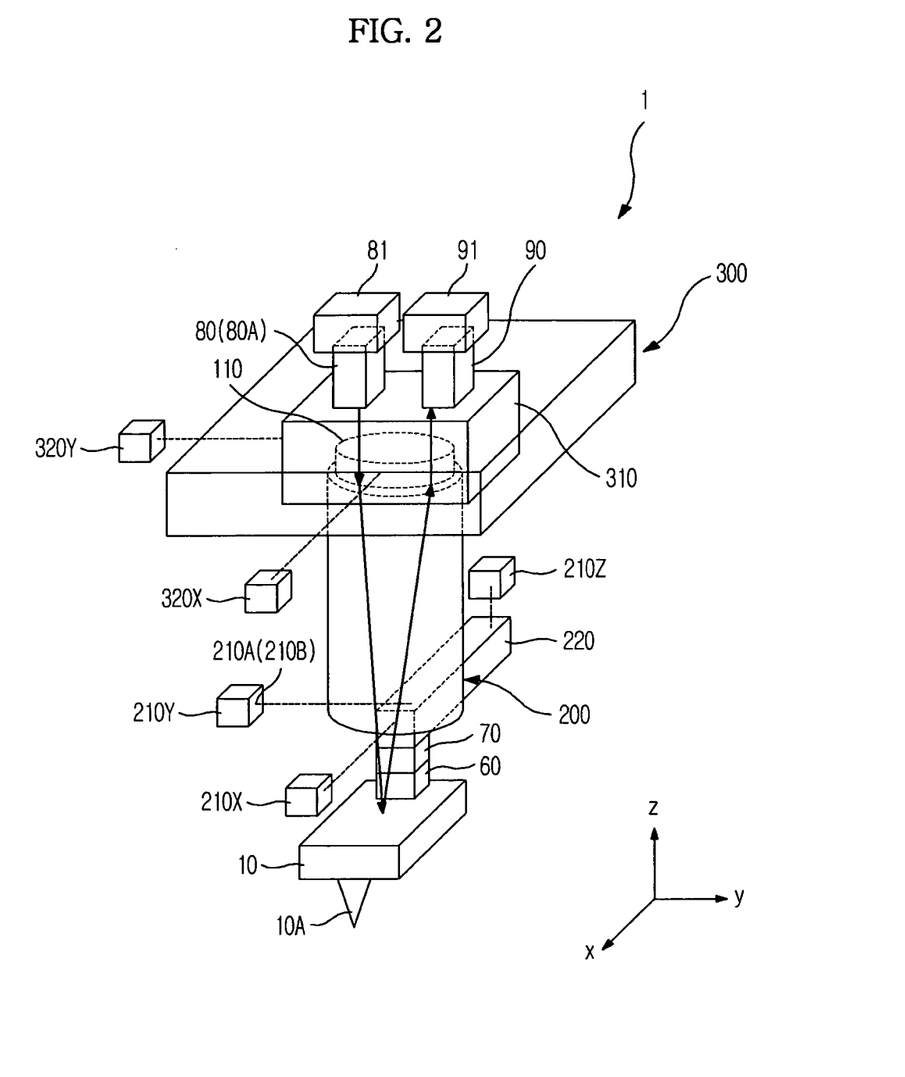
FIG. 2 is an enlarged perspective view of a part of the atomic force microscope illustrated in FIG. 1.

FIG. 1 is a diagram illustrating an atomic force microscope according to example embodiments. FIG. 2 is an enlarged perspective view of a part of the atomic force microscope illustrated in FIG. 1. Referring to FIGS. 1 and 2, an atomic force microscope 1 may include at least one cantilever 10 that detects an atomic force generated between atoms of the probe 10A and atoms of a specimen 20, and may maintain a constant atomic force while simultaneously scanning the atomic force. A probe 10A may be mounted to the cantilever 10 such that a driving displacement and a driving frequency may be changed by attractive force and repulsive force in relation to atoms of the specimen 20.

A Z-axis driver may be mounted to the cantilever 10 so that the cantilever 10 may be movable in a Z-axis direction identical to the direction of the specimen 20. A Z-axis displacement measurement sensor (not shown) may be mounted to the cantilever 10 so that the cantilever 10 may be arranged to measure the Z-axis displacement. A stage 30 that transfers the specimen 20 may be arranged at the bottom of the cantilever 10 and a specimen fixer 40 for fixing the specimen 20 onto the stage 30 may be arranged on the top of the stage 30. A vibration isolation table 50 that controls vibration of the stage 30 may be arranged at the bottom of the stage 30. At least one cantilever fixing module 60 that fixes the cantilever 10 and at least one oscillation piezoelectric motor 70 that oscillates the cantilever 10 at high speed may be arranged on the top of the cantilever 10. If the cantilever driver (not shown) is embedded in the cantilever 10, a vibration piezoelectric motor 70 may not be independently arranged.

At least one light source 80, at least one photo-detector 90, an optical system 100, and at least one objective lens 110 may be mounted on the top of the cantilever 10. The light source 80, such as a laser diode 80A, may generate a laser beam to measure a driving displacement of the cantilever 10. The photo-detector 90 may measure a beam reflected from the surface of the cantilever 10. The optical system 100 may confirm that the beam arrives at the surface of the cantilever 10. The objective lens 110 may focus the beam so that the focused beam illuminates the surface of the cantilever 10 and the beam reflected from the surface of the cantilever 10 may be transferred to the photo-detector 90. At least one light source positioning unit 81 that positions the light source 80 may be mounted to the light source 80 and at least one photo-detector positioning unit 91 that positions the photo-detector 90 may be mounted to the photo-detector 90.

At least one short-stoke scanner 200 and at least one long-stroke scanner 300 may be mounted on the top of the cantilever 10. The short-stroke scanner 200 may be mounted to the cantilever 10 so that a probe may perform short-stroke scanning of a specimen. The long-stroke scanner 300 may be mounted to the cantilever 10 so that it my perform long-stroke scanning of the specimen. The short-stroke scanner 200 may be mounted to the cantilever 10 to support the cantilever 10 and at the same time the probe 10A may precisely scan the complicated specimen 20 using a short-stroke such that a three-dimensional shape of the specimen may be measured. The short-stroke scanner 200 may include a piezoelectric tube scanner 200. The piezoelectric tube scanner 200 may include a piezoelectric material, and may perform a bending motion in which an X-axis driver is bent in an X-axis direction and a Y-axis driver is bent in a Y-axis direction, and may also perform linear motion in which a Z-axis driver is bent in a Z-axis direction.

The piezoelectric tube scanner 200 may measure X-axis, Y-axis, and Z-axis positions using a non-contact sensor through at least one piezoelectric tube scanner position measurement module 210. The piezoelectric tube scanner position measurement unit 210 may include piezoelectric tube scanner position measurement units 210X, 210Y, and 210Z respectively arranged in X-axis, Y-axis, and Z-axis directions. The piezoelectric tube scanner 200 may reflect a signal generated from a signal generator 210A of the piezoelectric tube scanner position measurement units 210X, 210Y, and 210Z onto the signal detector 210B of the piezoelectric tube scanner position measurement units 210X, 210Y, and 210Z. The probe 10A, the cantilever 10, the cantilever fixing module 60, the oscillation piezoelectric motor 70, and the piezoelectric tube scanner attachment 220 may be mounted to the piezoelectric tube scanner 200 such that they are movable along with the long-stroke scanner 300 while the long-stroke scanner 300 is driven in X-axis and Y-axis directions.

At least one long-stroke scanner 300 may be mounted to the top of the short-stroke scanner 200, such that it may perform long-stroke scanning of the specimen 20. The long-stroke scanner 300 may be a flexure scanner of flexure mechanism. The flexure scanner 300 may include a flexure scanner driver 310 that may perform linear motion in which the X-axis and Y-axis drivers are respectively movable in X-axis and Y-axis directions. A light source 80, a light source positioning unit 81, a photo-detector 90, a photo-detector positioning unit 91, an objective lens 110, and a piezoelectric tube scanner 200 may be mounted to the flexure scanner driver 310. The flexure scanner driver 310 may measure the X-axis and Y-axis positions using a non-contact sensor through at least one flexure scanner position measurement module 320. The flexure scanner position measurement unit 320 may include the flexure scanner position measurement modules 320X and 320Y respectively arranged along X-axis and Y-axis directions A light source 80, a photo-detector 90, and a piezoelectric tube scanner 200 may be mounted to the flexure scanner driver 310, and the cantilever 10 may be mounted to the piezoelectric tube scanner 200. When the flexure scanner driver 310 measures a specimen shape using the probe 10A by driving the flexure scanner 300 and the piezoelectric tube scanner 200, the beam illuminated on the surface of the cantilever may be fixed so that the beam is prevented from escaping from the surface of the cantilever 10. The flexure scanner 300 may be able to perform linear motion in which the X-axis and Y-axis drivers, each of which may use a piezoelectric motor, may precisely move long-stroke in X-axis and Y-axis directions at high speed. The piezoelectric tube scanner 200 may perform a bending motion in which an X-axis driver of the piezoelectric motor may be bent in an X-axis direction and a Y-axis driver of the piezoelectric motor may be bent in a Y-axis direction, and may also perform linear motion in which a Z-axis driver of the piezoelectric motor is bent in a Z-axis direction such that the short stroke may be precisely moved at high speed.

While the flexure scanner 300 may precisely perform a long-stroke in X-axis and Y-axis directions at high speed, the piezoelectric tube scanner 200 may control the probe 10A to perform precise short-stroke scanning of the specimen at high speed using the X-axis and Y-axis directional bending motions and the Z-axis directional linear motion, such that a three dimensional (3D) shape of the specimen having a complicated structure may be precisely measured at high speed. When the piezoelectric tube scanner 200 is mounted to the flexure scanner driver 310, the center of mass of the piezoelectric tube scanner 200 may be the same or similar to that of the flexure scanner 300, such that vibration caused by the driving of the flexure scanner 300 and the piezoelectric tube scanner 200 may be reduced, and stiffness of X-axis, Y-axis, or Z-axis of the flexure scanner driver 310 may be increased. A natural resonance frequency of the flexure scanner driver 310 may be increased, such that vibration of the flexure scanner driver 310 caused by vibration of less than a natural resonance frequency of the flexure scanner driver 310 may be reduced, and X-axis, Y-axis, or Z-axis modification of the flexure scanner driver 310 may be reduced. Modification of the flexure scanner driver 310 caused by the driving of the flexure scanner 300 and the piezoelectric tube scanner 200 may be reduced.

The X-axis, Y-axis, or Z-axis stiffness of the flexure scanner 300 and the piezoelectric tube scanner 200 may be increased so that a natural resonance frequency of the flexure scanner 300 and the piezoelectric tube scanner 200 may be increased. Vibration of the flexure scanner 300 and/or the piezoelectric tube scanner 200, caused by vibration of less than a natural resonance frequency of either the flexure scanner 300 or the piezoelectric tube scanner 200, may be reduced, and X-axis, Y-axis, or Z-axis modification of the flexure scanner 300 and the piezoelectric tube scanner 200 may be reduced. Modification of the flexure scanner 300 and/or the piezoelectric tube scanner 200, caused by the driving of the flexure scanner 300 and the piezoelectric tube scanner 200, may be reduced.

The flexure scanner 300 may be mounted to at least one coarse approach system 120 such that the flexure scanner 300 and the piezoelectric tube scanner 200 may be transferred to the specimen. The coarse approach system 120 may be mounted to a bar 130 and the bar 130 may be supported by a column 140.

The atomic force microscope 1 according to example embodiments may further include at least one lock-in amplifier 400, an image processing module 500 and/or a display module 600. The lock-in amplifier 400 may measure a driving displacement, a vibration displacement and a vibration phase of the cantilever 10. The image processing module 500 may perform imaging of a 3D shape and a phase of the specimen. The display module 600 may display signals generated from the image processing module 500 and the optical system 100. A controller 700 may control the cantilever 10, the stage 30, the specimen fixer 40, the vibration isolation table 50, the oscillation piezoelectric motor 70, the light source 80, the light source positioning unit 81, the photo-detector 90, the photo-detector positioning unit 91, the optical system 100, the coarse approach system 120, the piezoelectric tube scanner 200, the tube scanner position measurement unit 210, the flexure scanner 300, the flexure scanner position measurement unit 320, the lock-in amplifier 400 and/or the image processing module 500.

In order to drive the flexure scanner 300 at high speed, the light source 80, the light source positioning unit 81, the photo-detector 90, the photo-detector positioning unit 91, the objective lens 110, and/or the piezoelectric tube scanner 200, that may be mounted to the flexure scanner driver 310, may have low mass. In order to drive the piezoelectric tube scanner 200 at high speed, the cantilever 10, the cantilever fixing module 60, the oscillation piezoelectric motor 70, and the piezoelectric tube scanner attachment 220, that may be mounted to the piezoelectric tube scanner 200, may have low mass. For example, in a case where the light source 80 such as a laser diode 80A is small in size and has low mass, the light source 80 may be mounted to the flexure scanner driver as illustrated in FIGS. 1 and 2, such that the light source 80 may move toward the flexure scanner 300 and at the same time a 3D shape of the specimen may be measured at high speed.

Methods of operating the atomic force microscope according to example embodiments may include an operation method of a contact mode in which the probe 10A scans the specimen 20 using the flexure scanner 300 and the piezoelectric tube scanner 200. Vibration of the stage 30 may be controlled by the vibration isolation table 50. The specimen 20 may be seated on the specimen fixer 40, and may be fixed on the stage 30 through the specimen fixer 40. The cantilever 10 may be seated on the cantilever fixing module 60 such that the cantilever 10 is fixed. The optical system 100 may determine whether a laser beam arrives at the surface of the cantilever 10, and the light source positioning unit 81 may position the light source 80 in such a manner that the laser beam arrives at the surface of the cantilever 10. The photo-detector positioning unit 91 may position the photo-detector 90 in such a manner that the laser beam reflected from the surface of the cantilever 10 arrives at the set position of the photo-detector 90.

In a case where the driving displacement of the cantilever 10 is measured by the photo-detector 90, and the flexure scanner 300 and the piezoelectric tube scanner 200 move toward the specimen 20 by driving the coarse approach system 120, the attractive force that is generated between the atoms of the probe 10A mounted to the cantilever 10 and the atoms of the specimen 20 may increase so that the probe 10A moves toward the specimen. The cantilever 10 including the probe 10A may be bent toward the specimen such that the driving displacement of the cantilever 10 is changed. In this case, the coarse approach system 120 may stop operation such that the flexure scanner 300 and the piezoelectric tube scanner 200 may stop moving toward the specimen 20.

In the case where the driving displacement of the cantilever 10 is measured using the photo-detector 90, and the cantilever 10 moves toward the specimen by driving the piezoelectric tube scanner 200, repulsive force that is generated between the atoms of the probe 10A mounted to the cantilever 10 and the atoms of the specimen 20 may increase such that the probe 10A moves in the opposite direction of the specimen. The cantilever 10 including the probe 10A may be bent so that the driving displacement of the cantilever 10 is changed. If the driving displacement of the cantilever 10 reaches a set position the cantilever 10 may stop moving toward the specimen.

The probe 10A may constantly control the driving displacement of the cantilever 10 while simultaneously contacting the specimen 20 and may measure a variation of the driving displacement of the cantilever 10 using the photo-detector 90. The flexure scanner position measurement unit 320 may measure the X-axis and Y-axis positions of the flexure scanner 300, and the flexure scanner 300 may be precisely driven at high speed through the X-axis and Y-axis directional long-strokes. The piezoelectric tube scanner position measurement unit 210 may measure the X-axis, Y-axis, and Z-axis positions of the piezoelectric tube scanner 200, the piezoelectric tube scanner 200 may be precisely driven at high speed so as to generate bending motion in the X-axis and Y-axis directions and linear motion in the Z-axis direction, and the probe 10A may precisely scan a specimen having a complicated structure.

The driving displacement of the cantilever 10 may be measured by the lock-in amplifier 400. The image processing module 500 may receives an output signal of the lock-in amplifier 400 so as to perform imaging of a 3D shape of the specimen. The display module 600 may receive an output signal of the image processing module 500 and may perform imaging of a 3D shape of the specimen using the received signal.

According to example embodiments, methods of operating an atomic force microscope may include the use of a dynamic mode in which the probe 10A scans the specimen 20 using the flexure scanner 300 and the piezoelectric tube scanner 200. Vibration of the stage 30 may be controlled by the vibration isolation table 50. The specimen 20 may be seated on the specimen fixer 40 and may be fixed on the stage 30 through the specimen fixer 40. The cantilever 10 may be seated on the cantilever fixing module 60 such that the cantilever 10 is fixed. The optical system 100 may determine whether a laser beam arrives at the surface of the cantilever 10 and the light source positioning unit 81 may position the light source 80 in such a manner that the laser beam arrives at the surface of the cantilever 10. The photo-detector positioning unit 91 may position the photo-detector 90 in such a manner that the laser beam reflected from the surface of the cantilever 10 arrives at the set position of the photo-detector 90.

In a case where the driving displacement of the cantilever 10 is measured by the photo-detector 90, and the flexure scanner 300 and the piezoelectric tube scanner 200 move toward the specimen 20 by driving the coarse approach system 120, the attractive force that is generated between the atoms of the probe 10A mounted to the cantilever 10 and the atoms of the specimen 20 may increase so that the probe 10A moves toward the specimen. The cantilever 10 including the probe 10A may be bent toward the specimen such that the driving displacement of the cantilever 10 is changed. In this case, the coarse approach system 120 may stop operation such that the flexure scanner 300 and the piezoelectric tube scanner 200 may stop moving toward the specimen 20.

The vibration displacement and the vibration frequency of the cantilever 10 may be measured by the photo-detector 90, and the oscillation piezoelectric motor 70 may be driven such that the cantilever 10 vibrates to have a constant vibration displacement and a constant vibration frequency. In the case where the driving displacement of the cantilever 10 is measured using the photo-detector 90, and the cantilever 10 moves toward the specimen by driving the piezoelectric tube scanner 200, vibration displacement of the cantilever 10 may be changed according to interaction between the atoms of the probe 10A mounted to the cantilever 10 and the atoms of the specimen 20. If the vibration displacement of the cantilever 10 reaches the set position the piezoelectric tube scanner 200 may stop operation such that the cantilever 10 may stop moving toward the specimen 20.

For example, the oscillation piezoelectric motor 70 may be driven in a manner that the cantilever 10 vibrates and the vibration displacement of the cantilever 10 may be constantly controlled under the condition that the probe 10A taps the specimen. Simultaneously, the vibration displacement variation of the cantilever 10 may be measured using the photo-detector 90. As another example, the oscillation piezoelectric motor 70 may be driven to vibrate the cantilever 10. Under the condition that the probe 10A does not contact the specimen 20, the vibration displacement or the vibration frequency of the cantilever 10 may be constantly controlled, and a vibration displacement variation, the vibration frequency variation, and/or the vibration phase variation of the cantilever 10 may be measured using the photo-detector 90. The X-axis and Y-axis positions of the flexure scanner 300 may be measured using the flexure scanner position measurement unit 320, and the X-axis and Y-axis directional long-strokes of the flexure scanner 300 may be precisely operated at high speed. The piezoelectric tube scanner position measurement unit 210 may measure the X-axis, Y-axis, and Z-axis positions of the piezoelectric tube scanner 200, and may be precisely driven at high speed so as to generate bending motion of the X-axis and Y-axis directions and linear motion of the Z-axis direction, such that the probe 10A precisely scans a specimen having a complicated structure through a short stroke at high speed.

The lock-in amplifier 400 may measure the vibration displacement and the vibration phase of the cantilever 10. The image processing module 500 may receive the output signal of the lock-in amplifier 400, and may perform imaging of a 3D shape and phase of the specimen 200 using the received signal such that the display module 600 receives an output signal of the image processing module 500 so as to display a 3D shape and phase of the specimen.

Figure 3:
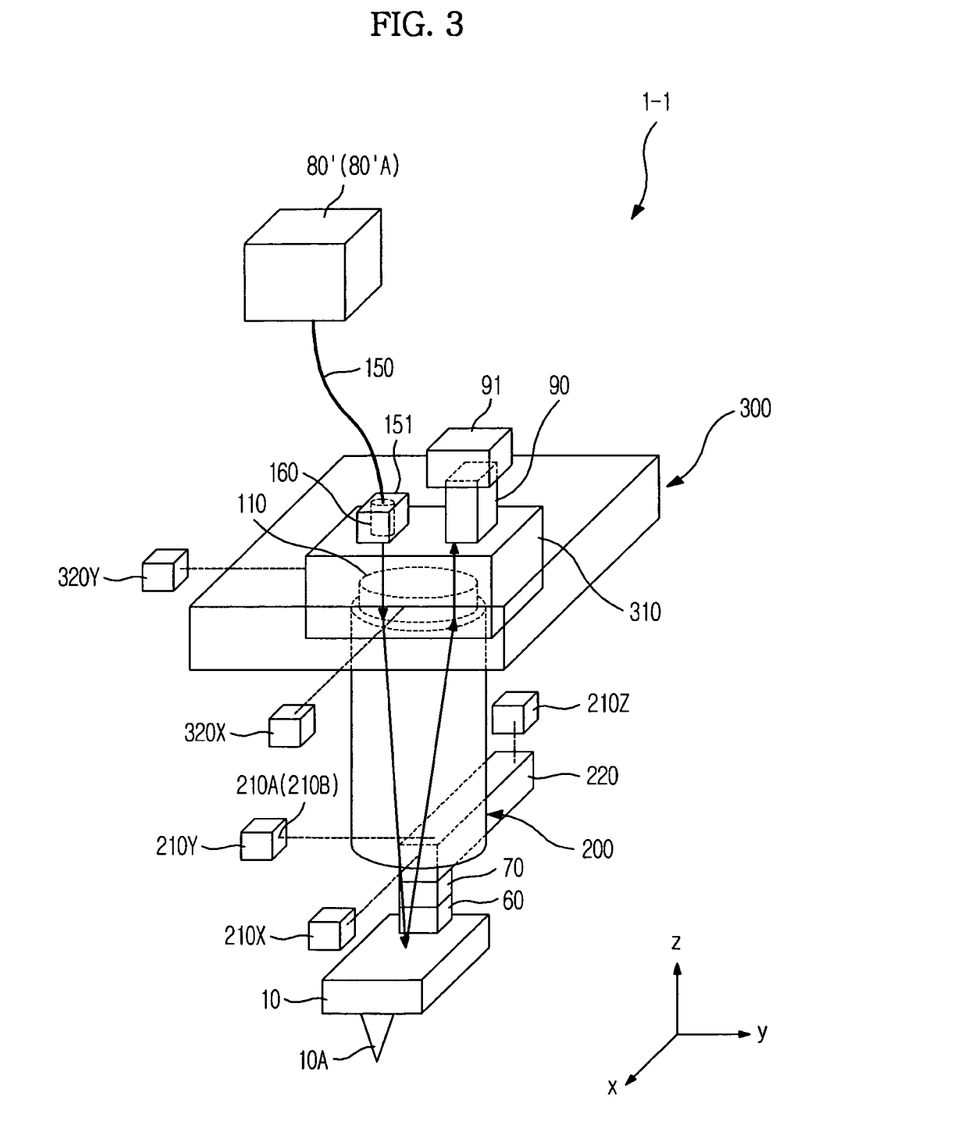
FIG. 3 is a perspective view illustrating a part of an atomic force microscope according to other example embodiments.

FIG. 3 is a perspective view illustrating part of an atomic force microscope according to other example embodiments. The same or similar elements as those described with respect to FIGS. 1 and 2 may be denoted by the same numerals and a detailed description thereof may be omitted for convenience of description. Referring to FIG. 3, the atomic force microscope 1-1 according to example embodiments may fix the light source 80' to the external part of the flexure scanner driver 310 for a light source 80', for example a laser diode 80'A, that is small in size and has large mass such that the flexure scanner 300 can measure a 3D shape of the specimen 20 without moving the light source 80' at high speed.

In the case of using the atomic force microscope 1-1 according to example embodiments, the light source 80' may be fixed to an external part of the flexure scanner driver 310 and may move a beam emitted from the light source 80' using the fiber optics 150. The beam generated from the fiber optics 150 may be converted into a parallel beam and/or a condensed beam using the collimator lens 160 such that the output beam of the fiber optics 150 is not spread out in a wide range. The fiber optics 150 may be positioned using the fiber optics positioning unit 151 and the photo-detector 90 may be positioned using the photo-detector positioning unit 91. The collimator lens 160 may focus the beam on the surface of the cantilever 10 and may transmit the beam reflected from the surface of the cantilever 10 to the photo-detector 90. Attractive force and repulsive force in relation to the atoms of the specimen 20 may be derived through the probe 10A. The cantilever 10 may be fixed using the cantilever fixing module 60 and the oscillation piezoelectric motor 70 may vibrate the cantilever 10 at high speed.

By the flexure scanner driver 310, the signal generated from the signal generator 210A of the flexure scanner position measurement unit 320 may be reflected onto the signal detector 210B of the flexure scanner position measurement unit 320. The signal generated from the signal generator 210A of the piezoelectric tube scanner position measurement unit 210 may be reflected onto the signal detector 210B of the piezoelectric tube scanner position measurement unit 210 through the piezoelectric tube scanner attachment 220. The fiber optics 150, the fiber optics positioning unit 151, the photo-detector 90, the photo-detector positioning unit 91, the collimator lens 160, the objective lens 110, and the piezoelectric tube scanner 200 may be mounted to the scanner driver 310 using the flexure scanner driver 310, and the controller (not shown) may additionally control the fiber optics positioning unit 151.

The atomic force microscope 1-1 according to example embodiments may allow the probe 10A to scan the specimen 20 using the flexure scanner 300 and the piezoelectric tube scanner 200, although the light source 80' is fixed to the exterior of the flexure scanner driver 310 such that it can precisely measure a 3D shape of a complicated specimen 20.

Figure 4:
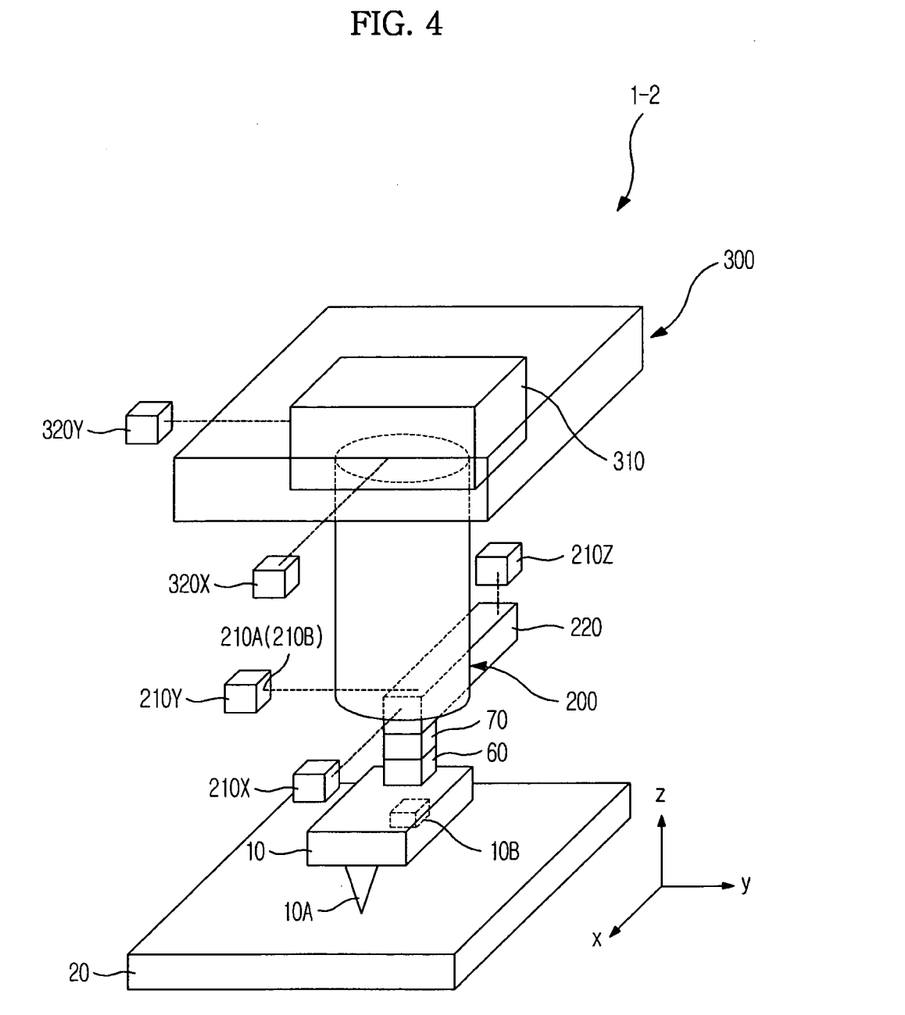
FIG. 4 is a perspective view illustrating a part of an atomic force microscope according to still other example embodiments.

FIG. 4 is a perspective view illustrating part of an atomic force microscope according to still other example embodiments. The same or similar elements as those described with respect to FIGS. 1-3 may be denoted by the same numerals and a detailed description thereof may be omitted for convenience of description. Referring to FIG. 4, an atomic force microscope 1-2 according to example embodiments may measure driving displacement of the cantilever 10 using a cantilever driving displacement measurement sensor 10B embedded in the cantilever 10. The atomic force microscope 1-2 may adjust an output value of the cantilever driving displacement measurement sensor 10B of the cantilever 10 to the set position during a contact mode, measure driving displacement of the cantilever 10 using the cantilever driving displacement measurement sensor 10B of the cantilever 10, and move the flexure scanner 300 and the piezoelectric tube scanner 200 toward the specimen 20 by driving the coarse approach system (not shown). If the driving displacement of the cantilever 10 is changed the coarse approach system (not shown) may stop operation.

In a case where the atomic force microscope 1-2 measures the driving displacement of the cantilever 10 using the cantilever driving displacement measurement sensor 10B embedded in the cantilever 10, drives the piezoelectric tube scanner 200 and moves the cantilever 10 toward the specimen 20, the probe 10A may move in the opposite direction of the specimen 20 so that the driving displacement of the cantilever 10 is changed. If the driving displacement of the cantilever 10 reaches the set position the cantilever 10 may stop moving toward the specimen 20.

The probe 10A may constantly control the driving displacement of the cantilever 10 while simultaneously contacting the specimen 20 and a variation of the driving displacement of the cantilever 10 may be measured using the cantilever driving displacement measurement sensor 10B embedded in the cantilever 10. The flexure scanner position measurement unit 320 may measure the X-axis and Y-axis positions of the flexure scanner 300, and the flexure scanner 300 may be precisely driven at high speed through the X-axis and Y-axis directional long-strokes. The piezoelectric tube scanner position measurement unit 210 may measure the X-axis, Y-axis, and Z-axis positions of the piezoelectric tube scanner 200, the piezoelectric tube scanner 200 may be precisely driven in the X-axis, Y-axis and Z-axis directions, and the probe 10A may precisely scan the specimen having a complicated structure.

An atomic force microscope according to yet other example embodiments may adjust the output value of the cantilever driving displacement measurement sensor embedded in the cantilever to the set position in the dynamic mode, measure driving displacement of the cantilever 10 using the cantilever driving displacement measurement sensor 10B of the cantilever 10, and move the flexure scanner 300 and the piezoelectric tube scanner 200 toward the specimen 20 by driving the coarse approach system (not shown). If the driving displacement of the cantilever 10 is changed the coarse approach system (not shown) may stop operation.

In a case where the atomic force microscope measures vibration displacement and vibration frequency of the cantilever 10 using the cantilever driving displacement measurement sensor 10B embedded in the cantilever 10, the atomic force microscope may drive the oscillation piezoelectric motor 70 such that it vibrates the cantilever 10 at a constant vibration displacement and a constant vibration frequency. In a case where the atomic force microscope measures the driving displacement of the cantilever 10 using the cantilever driving displacement measurement sensor 10B embedded in the cantilever 10, and drives the piezoelectric tube scanner 200 so as to move the cantilever 10 toward the specimen 20, the vibration displacement of the cantilever 10 may be changed. If the vibration displacement of the cantilever 10 reaches the set position the piezoelectric tube scanner 200 may stop operation so that the cantilever 10 also stops moving toward the specimen 20.

For example, the oscillation piezoelectric motor 70 may be driven in a manner that the cantilever 10 vibrates and the vibration displacement of the cantilever 10 may be constantly controlled under the condition that the probe 10A taps the specimen. Simultaneously, the vibration displacement variation of the cantilever 10 may be measured using the cantilever driving displacement measurement sensor 10B embedded in the cantilever 10. As another example, the oscillation piezoelectric motor 70 may be driven to vibrate the cantilever 10. Under the condition that the probe 10A does not contact the specimen 20, the vibration displacement or the vibration frequency of the cantilever 10 may be constantly controlled and a vibration displacement variation, the vibration frequency variation, and/or the vibration phase variation of the cantilever 10 may be measured using the cantilever driving displacement measurement sensor 10B embedded in the cantilever 10. The X-axis and Y-axis positions of the flexure scanner 300 may be measured using the flexure scanner position measurement unit 320, and the X-axis and Y-axis directional long-strokes of the flexure scanner 300 may be precisely operated at high speed.

The piezoelectric tube scanner position measurement unit 210 may measure the X-axis, Y-axis, and Z-axis positions of the piezoelectric tube scanner 200, and the piezoelectric tube scanner 200 may be precisely driven in X-axis, Y-axis, and Z-axis directions such that the probe 10A may precisely scan a specimen 20 having a complicated structure at high speed.

According to example embodiments, atomic force microscopes and methods for measuring a specimen using the same may control a probe to scan the specimen using both a short-stroke scanner and a long-stroke scanner such that a three dimensional (3D) shape of the specimen having a complicated structure may be precisely measured at high speed.

While example embodiments have been particularly shown and described, it will be understood by one of ordinary skill in the art that variations in form and detail may be made therein without departing from the spirit and scope of the claims.

What is claimed is:

1. An atomic force microscope, comprising:
   a stage configured to transfer a specimen;
   at least one cantilever including a probe, the cantilever configured such that at least one of a driving displacement and a driving frequency of the cantilever are based on forces between the cantilever and the specimen;
   at least one short-stroke scanner configured to perform short-stroke scanning of the specimen, the cantilever connected to the short-stroke scanner;
   at least one long-stroke scanner configured to perform long-stroke scanning of the specimen, the short-stroke scanner connected to the long-stroke scanner; and
   at least one coarse approach system configured to transfer the short-stroke scanner and the long-stroke scanner to the specimen.

2. The atomic force microscope according to claim 1, wherein the short-stroke scanner includes a piezoelectric tube scanner of a piezoelectric material.

3. The atomic force microscope according to claim 1, wherein the long-stroke scanner includes a flexure scanner.

4. The atomic force microscope according to claim 3, wherein the flexure scanner includes a flexure scanner driver configured to be driven in X-axis and Y-axis directions.

5. The atomic force microscope according to claim 4, wherein the short-stroke scanner is connected to the flexure scanner driver in a Z-axis direction, the short-stroke scanner including a piezoelectric tube scanner, and
   the piezoelectric tube scanner is configured to move in a bending motion in X-axis and Y-axis directions, and to move in a linear motion in a Z-axis direction.

6. The atomic force microscope according to claim 4, wherein the flexure scanner driver includes a light source configured to emit a beam to measure a driving displacement of the cantilever; and
 a photo-detector configured to measure the beam reflected from a surface of the cantilever.

7. The atomic force microscope according to claim 6, further comprising:
 an optical system configured to confirm that the beam arrives at the surface of the cantilever; and
 an objective lens configured to convert the beam emitted from the light source into a condensed beam, illuminate the surface of the cantilever with the condensed beam, and transmit the beam reflected from the surface of the cantilever to the photo-detector.

8. The atomic force microscope according to claim 6, wherein the light source includes a light-source positioning unit configured to position the light source, and
 the photo-detector includes a photo-detector positioning unit configured to position the photo-detector.

9. The atomic force microscope according to claim 1, further comprising:
 a light source on an exterior of the long-stroke scanner configured to generate a beam used to measure the driving displacement of the cantilever; and
 fiber optics configured to transfer the beam emitted from the light source.

10. The atomic force microscope according to claim 9, further comprising:
 a collimator lens configured to convert the beam transferred from the fiber optics into one of a parallel beam and a condensed beam; and
 a fiber-optics positioning unit configured to position the fiber optics.

11. The atomic force microscope according to claim 4, further comprising:
 a flexure scanner position measurement unit configured to measure a variation of X-axis and Y-axis positions of the flexure scanner driver.

12. The atomic force microscope according to claim 2, further comprising:
 a piezoelectric tube scanner position measurement unit configured to measure X-axis, Y-axis and Z-axis positions of the piezoelectric tube scanner; and
 a piezoelectric tube scanner attachment mounted to the piezoelectric tube scanner such that a signal generated from a signal generator of the piezoelectric tube scanner position measurement unit is reflected onto a signal detector of the piezoelectric tube scanner position measurement unit.

13. The atomic force microscope according to claim 6, wherein the light source includes a laser diode configured to generate a laser beam.

14. The atomic force microscope according to claim 1, further comprising:
 a specimen fixing module configured to fix the specimen to the stage; and
 a vibration isolation table configured to control vibration of the stage.

15. The atomic force microscope according to claim 1, further comprising:
 at least one oscillation piezoelectric motor configured to vibrate the cantilever.

16. The atomic force microscope according to claim 1, further comprising:
 at least one lock-in amplifier configured to measure at least one of a driving displacement, a vibration displacement and a vibration phase of the cantilever.

17. The atomic force microscope according to claim 4, wherein the piezoelectric tube scanner is mounted to the flexure scanner driver in such a manner that a center of mass of the piezoelectric tube scanner is about identical to that of the flexure scanner.

18. The atomic force microscope according to claim 1, wherein the cantilever includes a Z-axis driver configured to drive the cantilever in a Z-axis direction, and includes a Z-axis displacement measurement sensor configured to measure a Z-axis displacement of the cantilever.

19. An atomic force microscope, comprising:
 a stage configured to transfer a specimen;
 at least one cantilever including a probe, the cantilever configured such that at least one of a driving displacement and a driving frequency of the cantilever are based on forces between the cantilever and the specimen;
 at least one piezoelectric tube scanner configured to perform short-stroke scanning of the specimen in X-axis, Y-axis, and Z-axis directions, the cantilever connected to the piezoelectric tube scanner; and
 at least one flexure scanner configured to perform long-stroke scanning of the specimen in X-axis and Y-axis directions, the piezoelectric tube scanner connected to the flexure scanner in a Z-axis direction.

20. A method of measuring a specimen, comprising:
 fixing a specimen to a stage;
 fixing a cantilever to a cantilever fixing module;
 simultaneously moving a flexure scanner and a piezoelectric tube scanner towards the specimen by measuring driving displacement of the cantilever and driving a coarse approach system;
 moving the cantilever toward the specimen by driving the piezoelectric tube scanner;
 controlling the driving displacement of the cantilever under a condition that a probe contacts the specimen;
 measuring a variation of the driving displacement of the cantilever;
 driving the flexure scanner in X-axis and Y-axis directions, driving the piezoelectric tube scanner in X-axis, Y-axis and Z-axis directions, and scanning the specimen using the probe;
 measuring, by a lock-in amplifier, the driving displacement of the cantilever;
 receiving, at an image processing module, an output signal of the lock-in amplifier so as to perform imaging of a 3D shape of the specimen; and
 displaying, by a display module, the 3D shape of the specimen upon receiving an output signal of the image processing module.

* * * * *